United States Patent
Boboltz et al.

[11] 3,742,565
[45] July 3, 1973

[54] ROTARY CUTTER

[75] Inventors: Charles E. Boboltz, Belmont; Frederick K. Zwald; Ralph B. Baldwin, both of East Grand Rapids, all of Mich.

[73] Assignee: Oliver Machinery Company, Grand Rapids, Mich.

[22] Filed: July 31, 1970

[21] Appl. No.: 60,025

[52] U.S. Cl. .............................. 29/105 R, 29/95 R
[51] Int. Cl. ........................... B26d 1/12, B26d 1/00
[58] Field of Search .................... 29/105, 105 A, 96, 29/95

[56] References Cited
UNITED STATES PATENTS

| | | | |
|---|---|---|---|
| 3,121,939 | 2/1964 | Williams | 29/96 |
| 1,460,030 | 6/1923 | Mattson | 29/105 |
| 3,279,035 | 10/1966 | Johnson | 29/105 X |
| 3,279,034 | 10/1966 | Kaiser | 29/105 X |
| 2,877,535 | 3/1959 | Williams | 29/96 |
| 2,838,827 | 6/1958 | Wright | 29/96 |
| 1,838,520 | 12/1931 | Archer | 29/96 |
| 3,540,102 | 11/1970 | Yogus et al. | 29/96 |
| 3,464,098 | 9/1969 | Moore et al. | 29/105 |
| 2,664,617 | 1/1954 | Kralowetz | 29/105 |
| 2,751,663 | 6/1956 | Leuzinger | 29/105 A |
| 2,683,920 | 7/1954 | Williams | 29/105 |
| 1,348,279 | 8/1920 | Heywood | 29/105 |

*Primary Examiner*—Harrison L. Hinson
*Attorney*—Price, Heneveld, Huizenga and Cooper

[57] ABSTRACT

A plurality of cutting members are individually and detachably mounted on a rotatable drum and arranged in spaced and staggered helical rows. The cutting members include a cutting blade having a plurality of curvilinear cutting edges any one of which may be selected to extend beyond the drum periphery in a work engaging position. A seating block indexes the cutting blade in a work engaging position at a preselected cutting angle with respect to the work piece so that as the drum is rotated, the cutting edge makes a linear "plane" on the work surface and in addition permits blade sharpening by a cutting tool operable in a direction parallel to the drum axis. In so doing, it also serves to automatically index and position each of the cutting edges as each new edge is positioned for use.

8 Claims, 14 Drawing Figures

PATENTED JUL 3 1973 3,742,565

INVENTORS
CHARLES E. BOBOLTZ
FREDERICK K. ZWALD
RALPH B. BALDWIN
BY Price, Heneveld
Huizenga & Cooper
ATTORNEYS

ROTARY CUTTER

BACKGROUND OF THE INVENTION

This invention relates to a rotary cutter or planer and, more specifically, to a new and improved detachable cutting bit having a plurality of cutting edges.

The prior art is replete with various and sundry proposals for the facer-planing of materials such as for example wood. In order to achieve high volume production, relatively complex and expensive machinery has been developed, however, in spite of many suggestions, present proposals have been unsatisfactory for one or more of the following reasons.

First of all, in order to achieve a smooth cut, it is essential that all of the work engaging cutting edges be in perfect alignment. Otherwise, grooves, hollows, or scallops will be apparent if the various cutting edges are out of alignment. Present alignment procedures are time consuming and hence one of the more critical problems present in the industry from a standpoint of economics is that of shutdown time. That is, when a portion of the cutting blade becomes damaged, it is necessary to repair or replace that portion and many times it is required to resharpen the entire mechanism to bring the new portion into alignment with the old. This is extremely costly not only in relation to the actual sharpening operation, but also the lost production time. As a result of this, it has been proposed to provide a plurality of individual and detachable bits so that if there should be a break in one, it is only necessary to replace that one. however, even then, it has generally been necessary to resharpen the entire cutter mechanism to bring all of the bits into proper alignment. While the existing proposals provide in a crude way for individual adjustment of the individual bits, they are lacking in simplicity and ease of adjustment necessary to eliminate costly down time.

Also, none of the prior art suggests a bit having a plurality of cutting edges so that when one is damaged, another may be selected. Instead, present proposals require complete replacement of the individual damaged or worn blade resulting in higher costs.

Another serious difficulty with existing proposals is the irregularity or roughness of the surface which results from the way in which existing proposals slice the wood or material surface. This is most noticeable in the conventional blade mounted on a drum parallel to the drum axis. The effect is a series of "peaks and valleys" due to the blade's spacing. Those proposing individual bits spaced in helical rows alleviate some of this difficulty but still have not eliminated it.

Many proposals have also failed to adequately provide a simple and positive lock for the individual bits in the drum without relieving the problem of lack of automatic accurate alignment. In other words, in order to provide easy alignment adjustment, the locking elements have been cumbersome thereby offsetting any advantage in adjustment.

Still another critical drawback is the whine associated with planers. Although noise may not affect the performance of the machine, it is nonetheless critical in terms of labor relations and working environment.

Finally, none of the prior art suggests a simple way of sharpening the cutting edges of bits in a helical array. Existing proposals require a sharpener to fit in a grooved track which spirals around the drum. None suggest a cutter sharpener which travels parallel to the axis of the drum.

In summary, the prior art has failed to provide an economically feasible cutter which solves the above-mentioned problems. While certain proposals eliminate some of the problems, they do so at the expense of other ones.

SUMMARY OF THE INVENTION

It is a principal object of this invention to provide a rotary cutter having individual and detachable cutting members which have a plurality of cutting edges which can be selectively moved into a work engaging position.

It is a further principal object of this invention to provide a rotary cutter having individual and detachable cutting members which, when installed, are both automatically and accurately indexed into a work engaging orientation in alignment with adjacent cutting members.

It is another object of this invention to provide a rotary cutter which provides an extremely smooth cut and substantially eliminates tearouts, pickouts, scallops, and, in addition, reduces the uncomforatble noise during the cutting process.

It is yet another object of this invention to provide a rotary cutter having individual and detachable cutting elements which may be sharpened by a conventional tool which travels parallel to the axis of rotation.

For achievement of these and other objects apparent to those skilled in the art, this invention provides a rotatable drum having a plurality of spaced and staggered sockets adapted to receive a detachable cutting member having a work engaging blade projecting beyond the drum periphery. The blade has a plurality of curvilinear cutting edges and means are provided whereby each of the cutting edges may be moved into a work engaging position. The cutting member is mounted in the socket for joint rotation with the drum and includes means for indexing and seating the cutting edge at a preselected orientation with respect to the drum and work product. A locking means is provided for frictionally anchoring the cutting member in the socket in a positive and facile fashion.

The advantages of the rotary cutter provided by this invention are significant. The cutting blades can be replaced or rotated without requiring complete resharpening of the apparatus in order to properly align all adjacent cutting elements. The index feature eliminates this necessity and in addition permits the cutting elements to be positioned in a closer proximity than that provided by the prior art, this latter feature greatly reducing the high intensity noise during planing and, in addition, greatly reducing blade torque. The curvilinear cutting element is angularly related to the work product during contact so even though the drum motion is curvilinear, the curvature of the cutting edge effects a relatively linear knife edge with respect to the work product. In addition, this latter mentioned feature permits sharpening of the individual cutting elements with a conventional tool movable along a direction parallel to the drum axis thereby greatly simplifying the sharpening process and reducing the time requirement.

Still another important advantage is the pluraliy of cutting edges provided in each cutting member so that the destruction of one particular cutting edge does not destroy the entire cutting blade. Instead, all one needs to do is rotate the cutting blade so that a new cutting edge is presented to the work material.

DESCRIPTION OF THE PREFERRED EMBODIMENTS

Before turning to the drawings in detail, it should be understood that the rotary cutter proposed by this invention is adaptable for use with various conventional cutting and planing machines, the details of which are unimportat for the purpose of this disclosure. Also, the following description, for convenience, will pertain to a wood cutter or planer although it is envisioned that any type of material (ferrous or non-ferrous) could be worked on by the type of cutter proposed by this invention.

Figure 1:
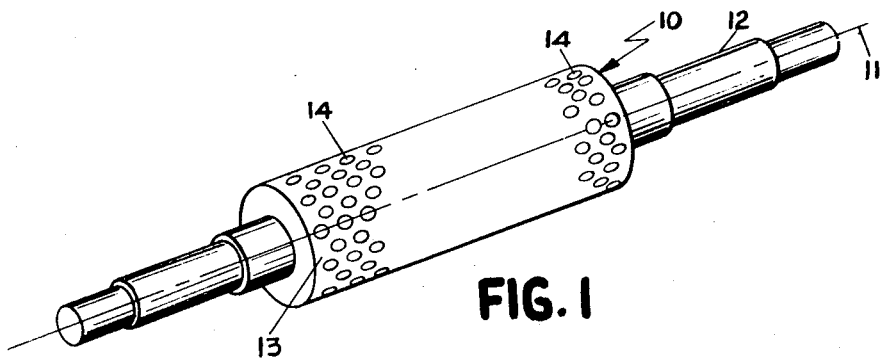
FIG. 1 is a perspective view of the rotatable drum proposed by this invention.
Figure 14:
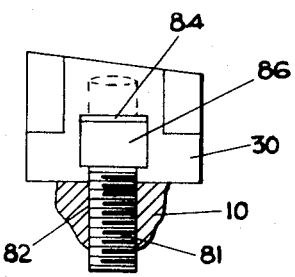
FIG. 14 is a frontal view of an alternative wedge block and locking screw arrangement.
Figure 3:
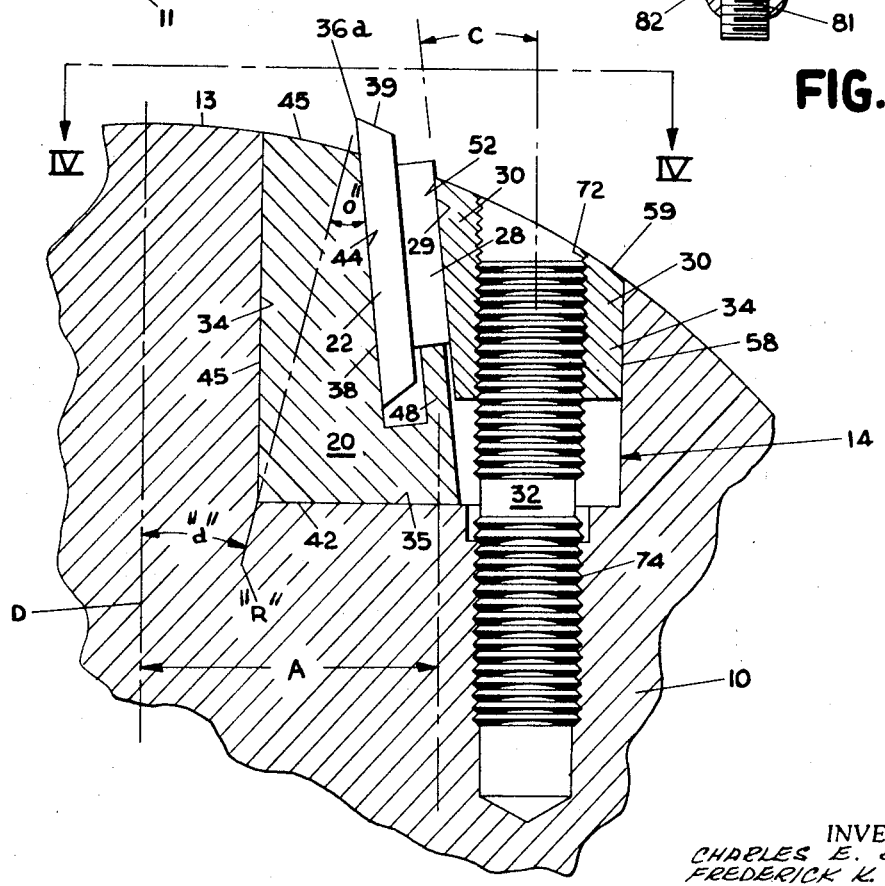
FIG. 3 is an enlarged cross-sectional view showng the cutter member proposed by this invention mounted in a drum bore.

Turning now to the drawings in detail, FIG. 1 shows a drum 10 affixed to a shaft 12 which is conventionally mounted in a planer machine for rotation. Preferably, the drum is cylindrical and includes a peripheral surface 13 and a plurality of sockets 14 bored into the drum facing for receiving individual and detachable cutting bits 16. FIG. 3 is a cross-section of one of the sockets and shows a bit comprosed of a seating block 20, a cutting tool 21 (having a cutting blade 22 and indexing block 28), a wedge block 30 and a double pitch locking stud 32 threadably engaging both the wedge block and drum. An alternative to the double pitch stud 32 is shown in FIG. 14 wherein a single pitch screw 80 is used to tighten down the wedge block. Briefly, the bit is anchored in the socket by wedge action between the interior wall 34 and base surface 35 of the socket and the sides 40, 58 of the seating and wedge block respectively. A wedge is also effected between the sloped engagement between the inner surface 56 and the wedge block and the wedge engaging surface 29 of the index block 28, which wedge engagement increases as stud 32 is tightened. With the bit installed, the cutting blade projects beyond drum surface 13 having a cutting edge 36a which engages the work product (not shown).

Figure 10:
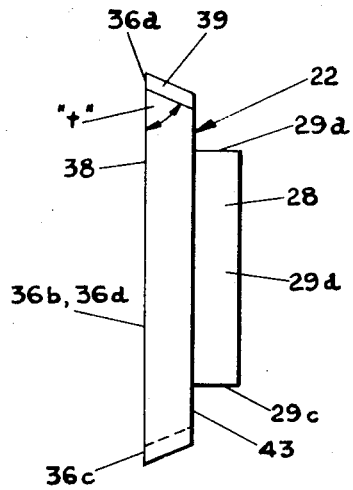
FIG. 10 is an end view of the cutting blade and index block.
Figure 9:
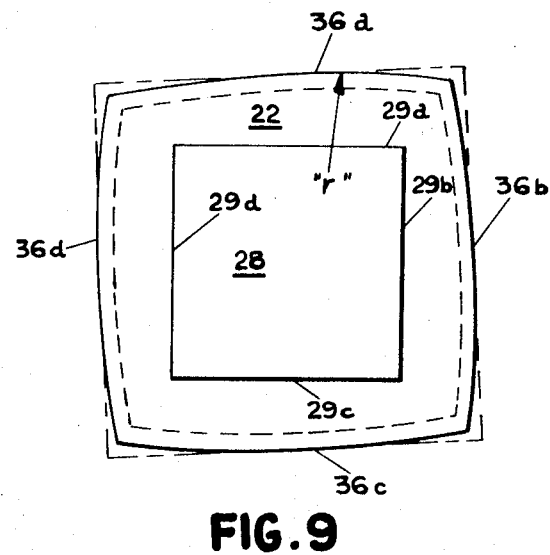
FIG. 9 is an elevation view of the cutting blade and index block proposed by this invention.
Figure 11:
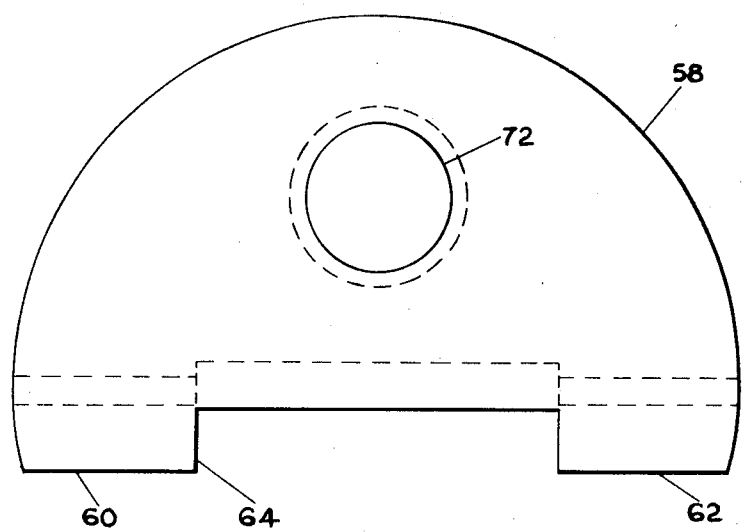
FIG. 11 is a top view of the wedge block proposed by this invention.
Figure 12:
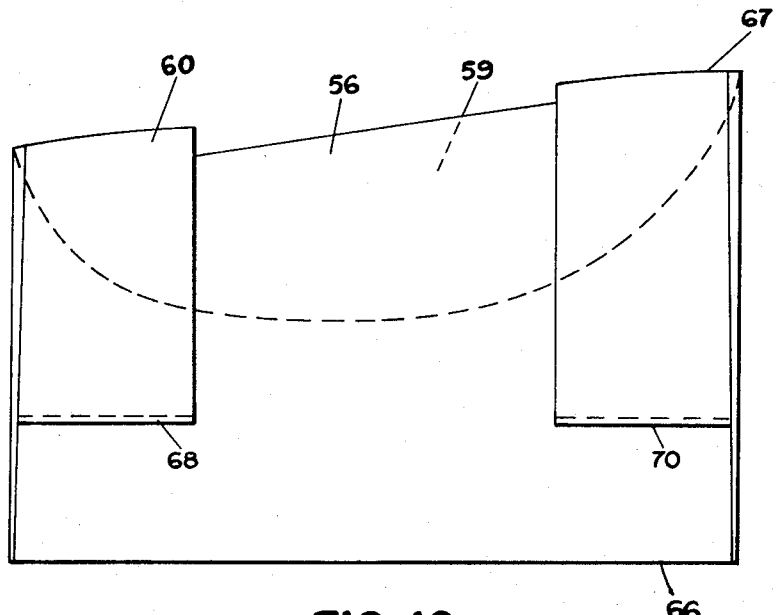
FIG. 12 is a frontal view of the wedge block.
Figure 13:
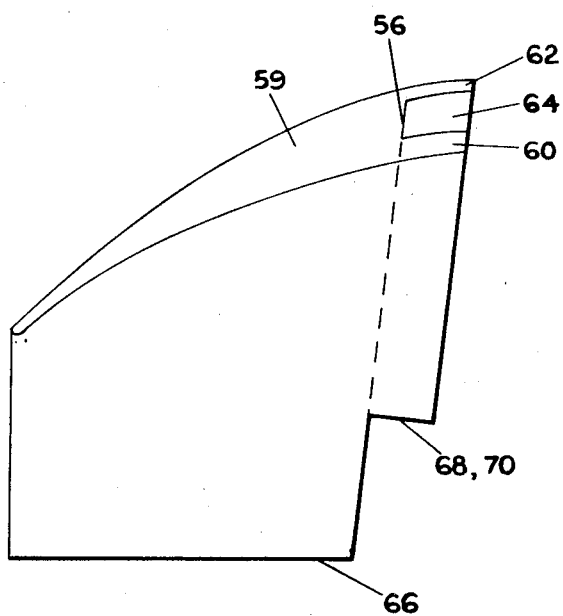
FIG. 13 is an end view of the wedge block.

Cutting blade 22 is shown in detail in FIGS. 9 and 10 and it has been found that in terms of blade hardness, strength, fatigue and longevity that a metal such as tungsten carbide proves very satisfactory in woodworking. The original configuration of the blade as shown in FIG. 9 is square (in outline) and has a thickness relatively small with relation to its pheripheral dimension. The four initially square sides 36a, 36b, 36c, and 36d are shaped by conventional means such as machining into a tapered and curvilinear form as sown in solid lines in FIG. 9. In the preferred embodiment, the taper or bevel angle "$t$" is approximately 25° while the curvature arc "$r$" is a circular arc approximately 26 times the radius of the drum. The significance of these dimensions will be clarified hereinafter though it should be realized that depending upon the composition of the work product and work objectives, these dimensions may vary widely. As described, blade 22 is thus comprised of four cutting edges 36a, 36b, 36c, and 36d, any of which can be positioned in the bit in a work engaging position as shown in FIG. 3 wherein the cutting edge shown is 36a. Common to all of the cutting edges is the frontal or knife face 38. Also, each cutting edge has a sloped back surface as a result of the bevel or taper. With reference to cutting edge 36a, the back surface is shown in FIGS. 3 and 10 at 39.

Affixed to the back side 43 of cutting blade 22 is an indexing block 28 shown also in detail in FIGS. 9 and 10. The purpose of index block 28 is to properly align the cutting blade in the bit so that the particular cutting edge in use is at a proper configuration with respect to both the drum and particular work product. The index block is dimensionally analogous to the cutting blade in that it will have a similar number of sides or stop surfaces 29a, 29b, 29c, and 29d which seat on the seating block to automatically index the respective cutting edge being selected. Preferably, index block 28 is square and is mounted to cutting blade 22 in any conventional manner such as welding or by use of an adhesive. For purposes of this disclosure, the preferred embodiment shows a cutting blade having four identical cutting edges each of which can be movably positioned into a work engaging position of identical alignment. Thus, it is necessary that index block 28 is centered with respect to cutting blade 22. However, there are foreseeable embodiments whereby the various cutting edges are not identical with resepct to each other and hence the index block may be positioned off center. Although, in the preferred embodiment, the index block is centered with respect to the cutting blade, its sides are not aligned with the respective sides of the cutting blade but rather are cocked so that its sides are non-parallel to the original sides of the cutting blade shown in outline in FIG. 9. The reason for this is that when the blade is positioned by the index block 28 being seated upon the seating block 20, the knife edge 36a shown in FIG. 3 will be non-parallel to the drum surface 13. However, as a result of the curvilinear shape of edge 36a, the resultant cutting effect on the work product is a relatively smooth clean linear type plane parallel to the axis of the drum though the motion is circular. This results from the combination of the cutter's inclination to the axis of the drum and the circular path of its movement. Thus, the material is truly planed or peeled off the work piece surface instead of sheared or chopped off as would result from the entire length of the cutting edge making simultaneous contact with the work surface.

Referring now to FIGS. 3 and 6–8, the seating block 20 is shown having a partially cylindrical exterior surface 40 corresponding to the curvature of socket 14. The base 42 is flat and when positioned in socket 14 abuts against the bottom surface 35 of the socket. Thus, this bottom surface 35 serves as a reference plane and must be accurately located with respect to rotational axis A of the drum. The top surface 45 is spherical to compliment the drum periphery. Seating block 20 has a flat interior surface 44 which knife edge 38 abuts against when the blade is indexed on the seating block. Faces 38 and 44 also serve as wedge engaging faces when the blade is anchored to the bit as a result of tightening stud 32. The lower interior portion of seating block 20 includes an upwardly and angularly extending flange 48 the upward slope of which coincides with the angular slope of face 44. The top surface 52 of flange 48 is flat and provides an index mount or stop for index block 28. The flange 48 is spaced from interior surface 44 on seating block 20 to provide a blade receiving groove 50. Groove 50 should be at least wide enough and deep enough to permit insertion of a portion of the cutting blade 22. Thus, the critical dimension is established. That is, with index block 28 properly mounted on the cutting blade, the height of index mounting surface 52 from the socket base 35 will accurately establish the height of cutting edge 36a relative to the drum axis. Thus, with a simple and accurately machined seating block and a simple cutting blade with attached index block, the orientation of the cutting edge 36 a with relation to both drum ahd work product is established automatically and no sensitive adjustments or threaded movement of various interacting parts is required. This eliminates both the time and special skills heretofore required in the field to replace a worn or damaged cutter.

In order to positively anchor the blade and seating block in socket 14, a locking wedge 30 and locking stud 32 provide the requisite wedgeing forces necesary to ensure proper placement of the cutting blade at all times during the working process. It will be appreciated that if there is any movement in radial direction of the cutting blade 22, the work piece and blade will in all probability be destroyed. Due to the relatively high number of revolutions per minute of the drum, the centrifugal force imparted on the respective cutting bit members is significantly high. The wedge relationship between seating block 20 and wedge block 30 prevents radial movement of the respective blocks, however, the cutting blade 22 and index block 28 if not properly restrained are free to move outwardly. Thus, it is necessary to impart sufficient bearing pressure between the cutting blade and index block and respective seating block and wedge block to prevent outward movement.

Wedge block 30 is shown in detail in FIGS. 3 and 11–13 as having an outer cylindrical surface 58 corresponding to the cylindrical dimensions of the socket and abutting thereagainst when inserted to anchor the bit in the socket. The upper surface 59 is spherically shaped to correspond to the curvature of drum periphery 13. Wedge block 30 includes a flat interior face 56 which is sloped to correspond to the angular slope of face 44 and flange 48 on the seating block. Face 56 includes a pair of projections 60, 62 spaced with respect to each other and likewise sloped identically to the face 44 and flange 48 of wedge block 20. Projections 60, 62 include frontal faces 68, 70 provided for engagement with face 29 of index block 28. The thickness of projections 60, 62 is sufficient to ensure that there is no engagement between face 56 of wedge block 30 and any portion of seating block 20. Thus, the wedge engagements are established as the wedge block is forced downward vertically into the socket of the drum. That is, frictional wedge engagement is provided between cylindrical surfaces 40 and 58 of the seating and wedge blocks with the cylindrical wall 34 of socket 14; surfaces 38 and 40 of the cutting blade and seating block; and surfaces 29 and 56 of the indexing block 28 and wedge block 30.

Figure 5:
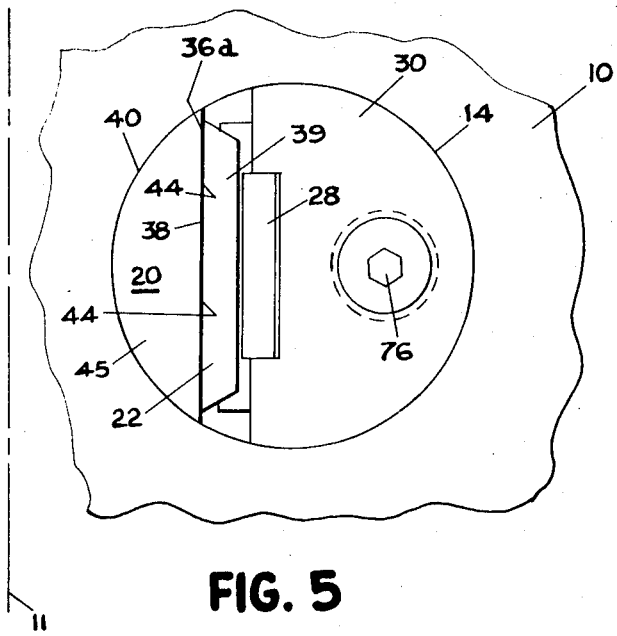
FIG. 5 is similar to FIG. 4 and shows in detail, the blade orientation.
Figure 7:
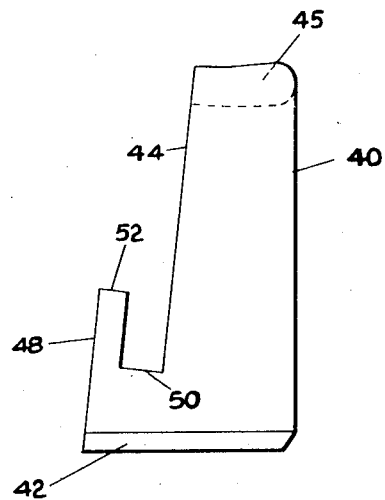
FIG. 7 is an end view of the seating block proposed by this invention.
Figure 8:
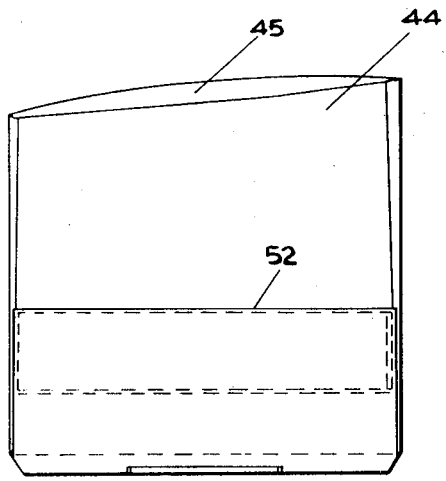
FIG. 8 is a frontal view of the seating block shown in FIG. 7.

Movement of wedge block 30 is provided in one embodiment by 9 double pitch screw 32 threadable through wedge block 30 and into the drum interior (FIG. 3). A threaded tap 72 is provided through the approximate center of wedge block 30, it being only necessary that the tap is in alignment with a second tap 74 starting at the socket base and penetrating into the drum body. In order to obtain wedge movement of block 30, a finer thread engagement is provided in wedge block 30 than in the drum. As a result, when the double pitch screw is tightened down, the vertical travel provided by one revolution of the stud and the drum is greater than that provided by the finer thread than the wedge. Hence, for each revolution of the stud, the wedge block is forced vertically downward into the socket as a result of the ratio of travel provided by the two threads. The dual pitch thread also provides a lock against loosening during operation. For convenience, stud 34 may be threaded into wedge block 30 from the bottom and by providing an allen wrench socket 76 in the upper end of stud 32 (as shown in FIG. 5), the stud can be tightened into tap 74 from the top.

An alternative way for moving wedge block 30 is shown in FIG. 14 and utilizes a screw 81 having a single pitch thread which engages tap 82 in the drum. A recess 84 is provided in the wedge block for receipt of the head 86 of screw. Wedge movement is provided by tightening the screw as the head is lodged into recess 84. It will be appreciated that other conventional alternatives are available for providing movement of wedge block 30.

Figure 6:
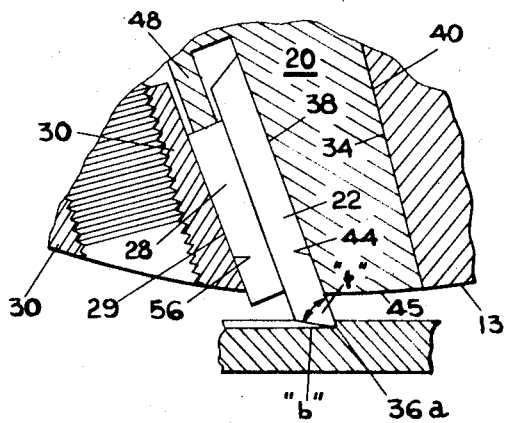
FIG. 6 is a view similar to FIG. 3 showing a piece of work product being planed.

Reference is now made in detail to FIGS. 3–6 for a description of the particular angular relationships between the various bit components with respect to the drum and work piece. The position of the drum and blade in FIGS. 3 and 6 is at its deepest point of planing penetration. That is, with the direction of rotation being counterclockwise, the knife edge 36a will begin to lift out and away from the work piece upon further rotation.

There are three critical angular relationships which should be defined prior to describing their particular arrangement. The angles referred to are the face or knife angle "$a$"; the clearing angle "$b$"; and the wedge angle "$c$". The knife angle is defined as the angle formed between knife face 38 and a radial "R" (FIG. 3) extending from the center of the drum axis and intersecting the knife edge 36a. The clearing angle (shown in FIG. 6) is the angle formed between the back face 39 of the cutting knife and a line normal to the radial R passing through the knife edge 36a. This can also be visualized as the work piece surface at the point of deepest penetration shown in FIGS. 3 and 6 since the work surface will generally be tangential to the drum surface at this time. The wedge angle "c" is defined as the angle formed between the wedge engaging surfaces 29, 56 with the direction of movement of the wedge block.

The knife or face angle affects grain lifting which is most undesirable. Ideally, a negative face angle or minimum positive face angle reduces grain lifting. However, as the face angle is reduced, the force acting on the knife edge 36a is magnified and therefore it is necessary in terms of strength, to beef up or increase the thickness of the cutting knife.

The third critical factor defined is the wedge angle "c" which is directly related to the amount of friction generated between friction engaging surfaces 29 and 56. It is well understood that if the tangent of the wedge angle is less than the coefficient of friction, a positive lock is obtained. It will be appreciated that any outward movement of cutting knife 22 during a planing operation will cause irreparable harm to both the work product and the knife. Proposals exist which provide a positive lock of the cutting knife, however, those known are at the expense of ease of adjustment and alignment of the cutting knife. This invention provide a positive lock of the knife in the bit and at the same time provides a knife which is indexed into proper alignment with the simple adjustment of one screw. In order to achieve this, it has been found that the wedge angle should not exceed 6° so that the tangent is less than the coefficient of friction. Also, it has been found that with a clearing angle of approximately 5°, a face angle of 20° essentially eliminates grain tearing and fiber compression. In order to achieve a cutting angle of 20° and wedge angle of 6° in the preferred embodiment, the center of the bit and socket is aligned on a plane offset a predetermined distance "A" from a plane "D" passing through the drum center but parallel to it, as shown in FIG. 3. The offset distance "A" is determined by selecting an offset angle "d" (FIG. 3) of approximately 14°. This will permit a cutting angle of 20° and a wedge angle of 6°. Offset distance "A" of course will vary depending on the radius of the drum. Offset angle "d" is defined as the angle between radial "R" and the plane "D" parallel to the socket axis which passes through the center of the drum.

Figure 4:
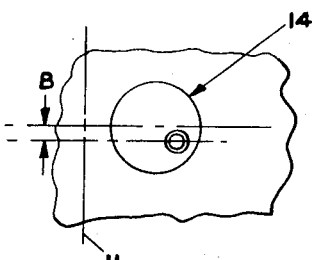
FIG. 4 is a view taken along lines IV—IV in FIG. 3 and shows the orientation of the locking stud proposed by this invention.

Referring to FIGS. 4 and 5, the angle of shear is determined by preselecting the orientation of the bit in the socket. The shear angle is the angle that the knife edge 36a makes with the work product with respect to the direction of travel of the work product. Referring to FIG. 6, if the work product is moving from right to left, the shear angle is shown as zero and the distance "B" shown in FIG. 4 is likewise zero. This is more clearly shown in FIG. 5 where the knife edge 36a is shown parallel to the rotational axis 11 of the drum. That is, with a zero degree shear angle, all points on the knife edge 36a come into work engagement with the work product at the same time. However, if shear distance "B" is not equal to zero, then a shear angle exists and one end of the knife edge 36a begins cutting before the opposite end. The amount of shear angle desired of course will vary depending on the particular application for which the drum and bits are designed.

Figure 2:
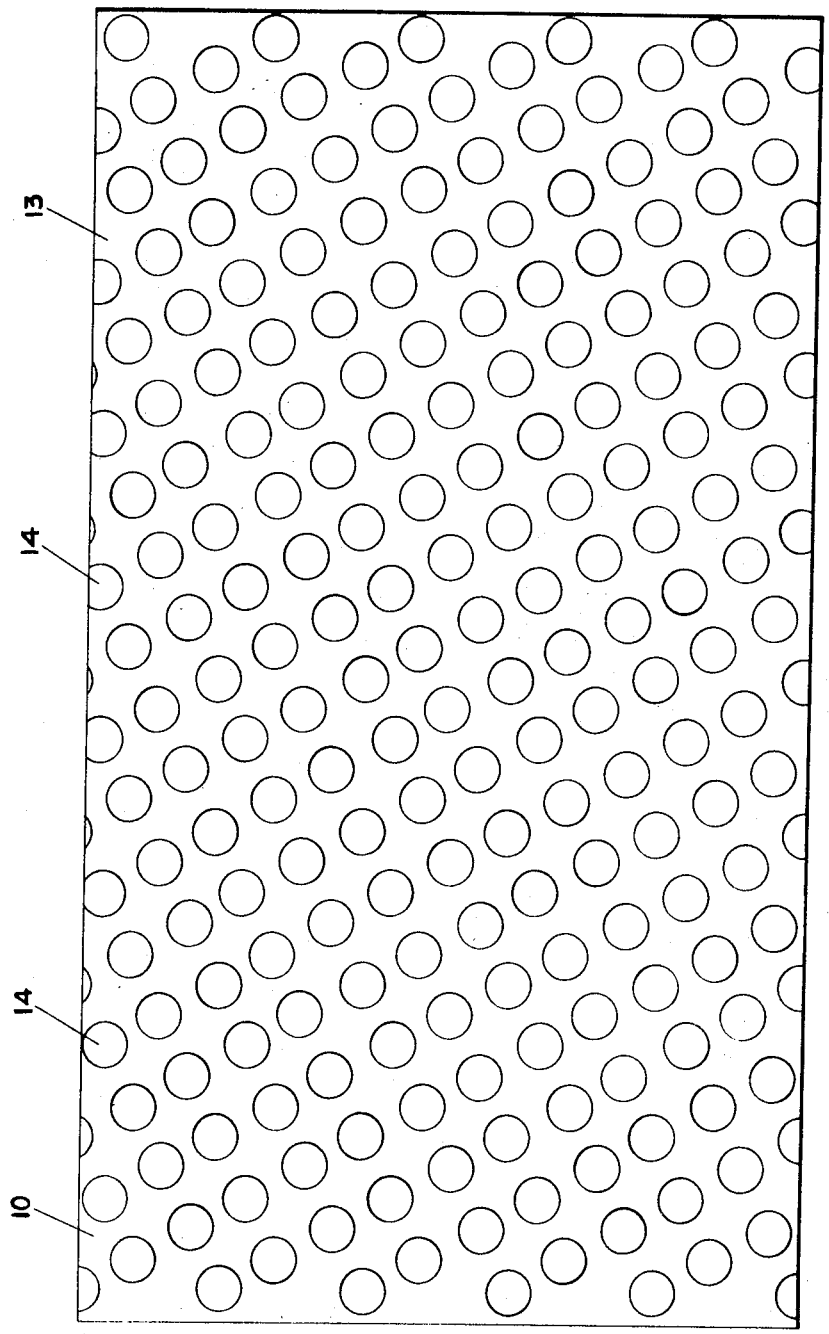
FIG. 2 is a planar view of the surface of the drum shown in FIG. 1.

Referring to FIG. 2, there is shown a layout view of the drum surface if a plane were formed of the drum surface 13. It is preferred that the plurality of sockets and drum bits are comprised of a series of helical rows spaced and staggered with respect to each other so that a continuous knife edge is presented to the work product (continuous with respect to the width of the drum). Since the planar layout of the cylindrical surface is a rectangle, a helical row will become a straight line on the bias of the rectangle. By spacing and staggering the rows as shown in FIG. 2, the spacings and gappings resulting from using individual bits is sufficiently minimized so that the visually apparent scalloping effect or uneven planing caused by many of the prior art proposals is reduced.

Thus, this invention provides a rotary cutter having individual and detachable cutting members which are removed or installed by the simple adjustment of one screw, which screw adjustment does not affect the blade alignment since it is properly indexed when mounted on the seating member. The rotary cutter provided effects an extremely smooth planar cut which eliminates tearouts, pickouts, scallops, and fiber compression. In addition, as a result of the positive index feature, the blade projection distance beyond the drum periphery can be reduced to a minimum. This results in several advantages over the prior art. For one thing, it eliminates much of the uncomfortable high intensity whining during the cutting process. Noise results from both air compression and cutting engagement. By now being able to reduce the amount of blade projection, air compression is minimized and it has also been found that the planing or peeling effect reduces the cutting shock so that the noise effect is extremely quiet in relation to existing arrangements.

Secondly, the reduction of the knife moment arm, i.e. the linear distance from the drum surface to the knife edge greatly reduces the torque on the knife edge thereby reducing the strain. Thirdly, the cutting angle provided by this invention along with the reduced distance of projection of the knife above the drum periphery yields an extremely efficient cleaning means with regards to the shavings produced by the planing. In prior proposals, wherein the cutting knives were substantially longer in projection beyond the drum periphery, the shavings cut out by the cutting knife created a problem in that they became rather large before breaking off thereby occasionally clogging up the cuttting operation. With the present proposal, the length of any particular shaving is no longer than the relatively short distance from the knife edge 36 to the drum periphery and shavings of this size are simply blown out as a consequence of the drum rotation.

In addition to the foregoing, and most importantly, the rotary cutter provided by this invention enables the economical manufacture of a cutting blade which has four cutting surfaces. Thus, if a blade should become damaged or simply wear out due to use, the entire blade need not be replaced, but rather simply rotated so that one of the other cutting edges is moved into a work engaging position. The preferred embodiment shows a cutting blade having four identical cutting edges, however it will be appreciated that various changes and modifications could be made. Hence, although but one embodiment of the present invention has been illustrated and described, it will be apparent to those skilled in the art that various changes and modifications may be made therein without departing from the spirit of the invention or from the scope of the appended claims.

The embodiments of the invention in which an exclusive property or privilege is claimed are defined as follows.

1. A rotary cutter having a rotatable drum and a plurality of cutting members individually and detachably mounted to said drum with their cutting edges inclined at an angle to the lengthwise dimension of the drum and having a portion projecting therefrom, said rotary cutter being characterized in that: each of said projecting portions is offset from and positioned at an angle to the axis of rotation of said drum and has a cutting edge which is a smoothly curved arc of constant radius, said radius being substantially greater than the radius of rotation of said rotary drum by a multiple thereof whereby segments of said cutting edge when moving circumferentially of said drum progressively trace a path substantially parallel to the axis of rotation of said drum to thereby plane or peel off the surface of the work piece on which it is operating.

2. A rotary cutter as described in claim 1 further characterized in that said drum includes a plurality of sockets for receipt of said cutting members, the axis of said sockets being spaced from and parallel to a plane passing through the rotational axis of the drum.

3. In a rotary cutter having a rotatable drum; a socket; and a cutting member detachably mounted to said drum in said socket and having a portion projecting therefrom, the improvement comprising: said socket having a floor and constant diameter circular wall parallel to the axis of said socket; said cutting member comprising a cutting blade having a plurality of cutting edges, one of which is selectively positioned in a work engaging position, a seating block positioned on the floor of said socket and having a seat formed thereon for receipt of said cutting member, said cutting member including a stop means permanently fixed to said blade and having the same number of sides as said blade has cutting edges, each of said sides being positioned in a predetermined location with respect to one of aid cutting edges, the sides of said stop means forming a plurality of stops for selective engagement with said seat so that when one of said stops is seated on said seat, the associated one of said cutting edges is automatically indexed in a work engaging position with respect to said drum and drum axis; and wedge block means positionable in said socket and engageable with said cutting blade and socket wall to lock said cutting member in said socket; the sides of said stop means being non-parallel to said cutting edges so that as said drum is rotated relative to the work piece, no more than a selected segment of said cutting edge comes into contact with said work piece at any one time.

4. The improvement according to claim 3 wherein said cutting edges are curvilinear, the sides of said stop means being non-parallel to the tangent line at the midpoint of said curvilinear edges.

5. The improvement according to claim 3 wherein the axis of said socket is spaced from and parallel to a plane passing through the rotational axis of the drum.

6. The improvement according to claim 3 wherein said cutting edges are smoothly curved along an arc of constant radius having its point of origin on the axis of rotation of the drum, said cutting edges when position in said work engaging position and moving circumferentially of said drum progressively tracing a path across a work piece in a plane parallel to the axis of rotation of said drum.

7. The improvement according to claim 3 wherein the tangent of the wedge angle between said interior locking wedge surface and said blade is less than the coefficient of friction between said materials.

8. A rotary cutter having a rotatable drum with a plurality of sockets opening through its surface and a plurality of cutting members individually and detachably mounted to said drum and having a portion projecting therefrom, each of said cutting members having a plurality of sides each of said sides having a cutting edge, said rotary cutter being characterized in that a seating block and a wedge block are received in each of said sockets the opposing surfaces of which are inclined to the axis of the socket; said seating block having a blade seat thereon spaced from the inclined face of said seating block and projecting toward said wedging block and forming a blade receiving pocket between the inclined face of said seating block and said blade seat; means on said seating block to automatically locate said blade seat axially of said socket a fixed and predetermined distance from the surface of said drum; a blade having an indexing stop thereon; said blade being received between said opposed surfaces of said seating and wedging blocks with a portion of said blade seated in said pocket and spaced from the bottom thereof and with said indexing stop resting on said blade seat for automatically and precisely limiting the distance said blade projects beyond said surface of said drum; a threaded member accessible at the surface of said drum and passing through said wedging block for urging said wedging block further into said opening and clamping said blade between said seating and wedging blocks and forcing said seating and wedging blocks against the walls of said socket.

* * * * *

# UNITED STATES PATENT OFFICE
CERTIFICATE OF CORRECTION

Patent No. 3,742,565　　　　　　　　　　Dated July 3, 1973

Inventor(s) Charles E. Boboltz et al.

It is certified that error appears in the above-identified patent and that said Letters Patent are hereby corrected as shown below:

Column 3, line 53, "comprosed" should read -- comprised --.

Column 6, line 17, "9" should read -- a --.

Signed and sealed this 1st day of January 1974.

(SEAL)
Attest:

EDWARD M. FLETCHER, JR.　　　　　RENE D. TEGTMEYER
Attesting Officer　　　　　　　　Acting Commissioner of Patents